United States Patent Office 3,167,407
Patented Jan. 26, 1965

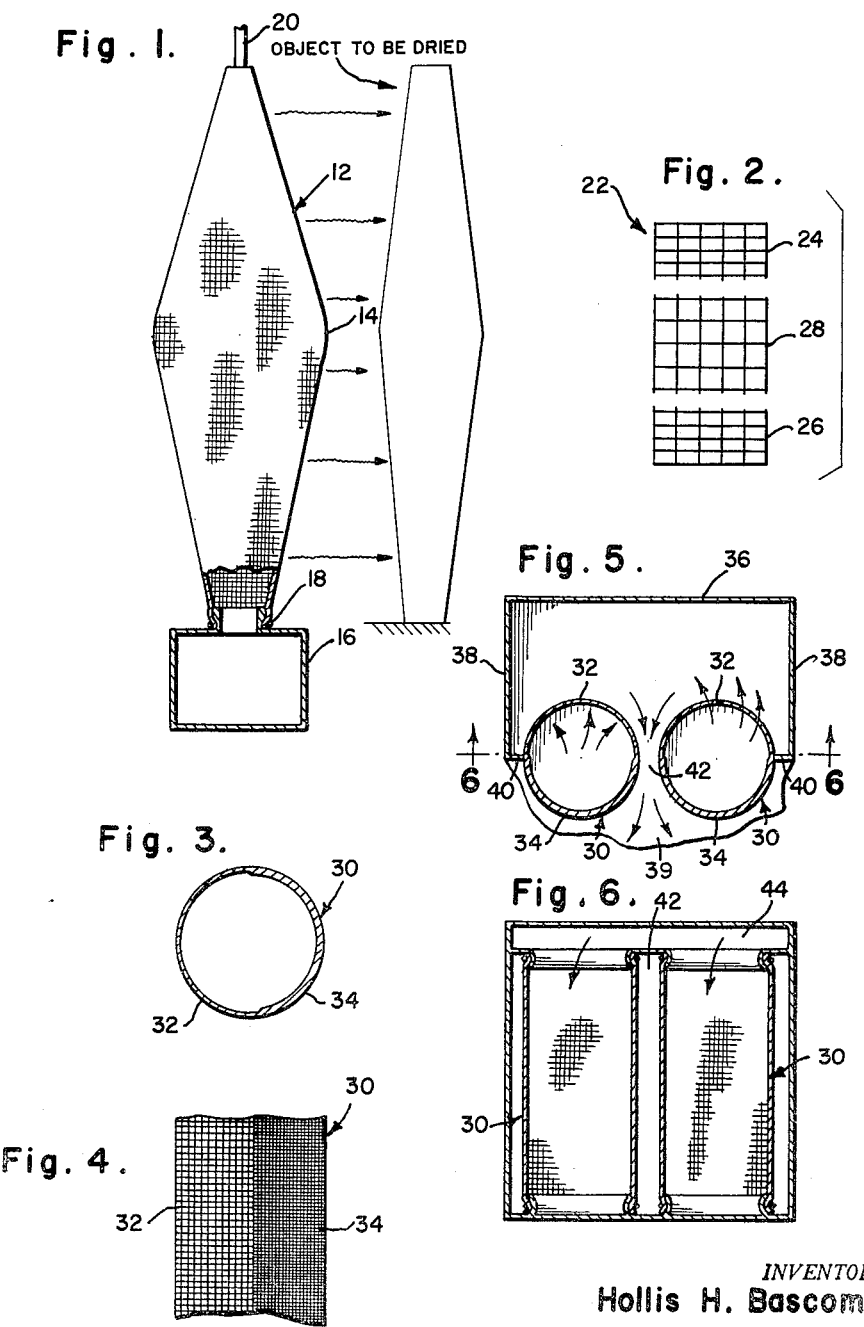

3,167,407
HOT GAS DISTRIBUTION FOR DRYING OBJECTS OF VARYING CROSS-SECTION
Hollis H. Bascom, Livermore, Calif., assignor to Coast Manufacturing and Supply Co., Livermore, Calif.
Filed Nov. 12, 1959, Ser. No. 852,372
2 Claims. (Cl. 34—103)

The present invention relates to improvements in hot gas distribution and is particularly concerned with the optimum distribution of gas for siccative purposes through the medium of glass fiber filter elements employed in a drier. The invention is a continuation in part of my patent application entitled Improvements in Hot Gas Filtration and Distribution in Driers, Serial No. 807,129, filed April 17, 1959, now U.S. Patent No. 3,128,160.

The parent application defines a hot gas filtration system wherein one or more plenums communicate gas, such as hot air, with the interior of a drying oven. Glass fiber cloth filter elements associated with terminal ends of the plenums disposed interiorly of the oven are positioned substantially adjacent an object to be dried, whereby incoming gasses are filtered immediately prior to contact with the object to be dried avoiding contamination of the gases between filtration and contact with the object to be dried. Means associated with the plenum heat and move gases through the filter elements into the oven, and exhaust means communicate hot gases in the oven with discharge ducts to exhaust or recirculate the gases for reuse.

The present invention is directed to the use of glass fiber filter elements as a means for selective distribution of heated air or gas to provide optimum drying conditions for given objects to be dried. Most gas driers, as in the drier described in my above noted parent application, include a primary carrier of heat which ordinarily is a hot gas. Accordingly, the best way to regulate the heat supply to the object to be dried resides in selective distribution of the volume of gas or air which passes on to the work.

It has been found that substantially optimum distribution of the gas may effectively be accomplished by employing glass fiber cloth filter elements of selective geometric configuration, by relative arrangement of the filter elements, and also by using filter elements with areas of different porosities.

One object of the present invention resides in the use of filter elements of predetermined geometric configuration for selective distribution of hot gases.

Another aspect resides in the use of glass fiber filter elements with areas of different porosities to accomplish this result.

Another object resides in the relative disposition of the filter elements to effect optimum hot gas distribution.

The present invention provides a filtration system capable of filtering gases which have been elevated to high operating temperatures ranging from about 150° to 800° F. or higher. The glass fiber cloth filter elements of the present invention can be employed for long periods with very high temperatures to effectively filter the heated gases without adverse effects upon the filter elements.

Other objects and advantages of the invention will become apparent upon reading the following specification and referring to the accompanying drawings in which similar characters of reference represent corresponding parts in each of the several views.

In the drawings:

FIG. 1 illustrates in side elevation a filter bag having a greater cross section at its center than at its top and bottom ends and shows the bag connected to a duct of incoming hot gases;

FIG. 2 fragmentarily illustrates an enlarged portion of filter material formed with greater porosity at its center than at its top and bottom, the porosity being exaggerated for purposes of illustration;

FIG. 3 is a top plan view in cross section of another tubular filter element longitudinally formed with first and second areas of differing porosities;

FIG. 4 is a fragmentary side elevation of the filter bag of FIG. 3;

FIG. 5 is a top plan view in cross-section schematically illustrating a preferred installation of the filter element of FIGS. 3 and 4 in a drier; and FIG. 6 is a view taken substantially on line 6—6 of FIG. 5.

FIG. 1 illustrates a filter bag 12 which may be formed of glass fiber cloth and which is formed with a greater cross section at its center as at 14 than at its top and bottom. The drawing schematically illustrates the bag secured at its bottom to a duct 16 of incoming hot gas or air, being secured thereon as by a draw string 18. A fitting 20 receives and closes the bag at its top and secures the top of the bag in a desired position as along a side wall of an oven. Bag 12 is particularly adapted to dry objects having a greater area to be dried at the center than at the ends. Thus assuming an object having a greater cross section at its center than at its ends is to be dried, it would be placed closely adjacent bag 12, and the latter having a greater cross section at its center, would emit a larger quantity of hot air at that point than at its end, for opimum uniform drying of the object.

FIG. 2 fragmentarily illustrates a portion of a filter material such as a filter bag 22 formed of glass fiber cloth which effects the same results as filter bag 12. In FIG. 2, the material has areas of different porosities, the top and bottom portions 42 and 26 being formed with smaller pores than the center 28. A filter of such character having varying porosity areas may be constructed of glass fiber cloth by varying the pickage in the web of cloth from which the filter bag is formed, alternatively, sections of different pickage may be joined.

Thus assuming the bag 22 is installed in an oven similar to bag 12 of FIG. 1, a larger quantity of hot gases would again be emitted through the center of the bag than at the ends, and optimum uniform drying of an adjacently positioned object having a relatively greater central cross section would again be effected.

It will be apparent that the foregoing filter elements of FIGS. 1 and 2 may be varied to conform to the requirements of objects of substantially any shape. For example, if the object to be dried had a greater cross section at its ends than at its center, filter bag 12 would be formed with a lesser cross section at its center than at its ends, or filter bag 22 could be formed with a relatively smaller porosity at its center.

FIGS. 3 and 4 illustrate a tubular filter bag 30 formed with two longitudinally extending, semi-circular, joined glass fiber cloth sections 32 and 34 of different porosities. Section 32 has been illustrated as having a greater porosity than section 34.

FIGS. 5 and 6 schematically illustrate a pair of filter elements 30 installed in an oven. The oven wall 36 with projecting side walls 38 define three walls of a plenum chamber. Filter bags 30 are secured to the oven floor 39 and are installed to fit snugly against projecting flanges 40 of walls 38, defining a slot or space 42 between the bags and are positioned with sections 32, having the greater porosity and accordingly the greater gas emitting ability, opposing oven wall 36. Most of the incoming hot gases from duct 44 are emitted through sections 32 where they collect in the defined plenum chamber and are discharged through the slot or spacing 42 defined by the space filter elements 30 into contact with an object to be dried. The velocity of air passing through slot 42 is determined by the volume of gas being discharged through sections 32 of the filter bags in relation to the spacing 42 between bags 30. By varying the spacing of the bags, it will be apparent selective air velocities may be obtained. This serves to compensate for the decrease in air velocity occasioned by its passage through the pores of the filter bags. Bags 30, in conjunction with walls 36 and 38 and also the ceiling and floor of the oven, thus form a four-wall plenum chamber. For purposes of illustration, only two filter bags 30 have been shown; however, it will be apparent that any number of filter bags covering any surface of an oven, whether the floor, ceiling or wall, may be employed without limitation as to number or length of the bags.

Joining of fabrics having varying permeabilities circumferentially of the filter bag as in bag 30 also permits variation of the distribution of gas along the length of a tubular element similar to filter elements 12 and 22 of FIGS. 1 and 2. For example, a tubular element could be formed with an upper half having a low permeability and a realtively high permeability lower half, thus affording a greater discharge of hot gases through the lower half.

The particular arrangement of FIGS. 5 and 6 provides a high efficiency, continuous filtration system, and a controlled velocity jet of air or gas.

The invention thus affords selective distribution of heated air or gas providing optimum drying conditions for substantially any object to be dried.

Although the foregoing invention has been described in some detail by way of illustration and example for purposes of clarity of understanding, it is understood that certain changes and modifications may be practiced within the spirit of the invention as limited only by the scope of the appended claims.

What is claimed is:
1. In a drying enclosure, apparatus for filtering and distributing hot gas, over the surface of an object of varying cross section, proportionally to the varying cross-sectional area of the object with respect to a central axis thereof comprising a bag formed by a plurality of variably spaced apart glass fibers so that said bag has a capacity to pass hot gas between adjacent fibers, said bag being formed with respect to a second axis centrally thereof so that the air passing capacity therethrough is substantially proportional to the varying cross-sectional area of the object, means for mounting said bag in the enclosure adjacent the object with the object axis and said second axis in substantially parallel relationship, and means for supplying hot gas interiorly of said bag so that the hot gas passes between said fibers to said object in amounts substantially proportional to the varying cross-sectional area of the object, the proportionality existing between each point of air emission from the bag and its corresponding point of impingement on the object.

2. In a drying enclosure, apparatus for filtering and distributing hot gas over the surface of an object proportionally to the cross-sectional area of the object with respect to a central axis thereof comprising a bag formed by a plurality of spaced apart glass fibers, said bag having a shape with respect to a second axis substantially geometrically similar to that of the object, means for mounting said bag in the enclosure adjacent the object with the object axis and said second axis in substantially parallel relationship, and means for supplying hot gas interiorly of said bag so that the hot gas passes between said fibers to said object in amounts substantially proportional to the cross-sectional area of the object, the proportionality existing between each point of air emission from the bag and its corresponding point of impingement on the object.

References Cited by the Examiner
UNITED STATES PATENTS

| | | | |
|---|---|---|---|
| 1,193,173 | 8/16 | Merrell et al. | |
| 1,259,890 | 3/18 | Maclachlan. | |
| 1,506,650 | 8/24 | Lough. | |
| 2,300,042 | 10/42 | Caldwell. | |
| 2,385,682 | 9/45 | Burkholder | 98—40 X |
| 2,654,161 | 10/53 | Bowen | 34—99 |
| 2,668,367 | 2/54 | Chedister | 34—99 |

NORMAN YUDKOFF, *Primary Examiner.*
BENJAMIN BENDETT, *Examiner.*